(12) United States Patent
Asada

(10) Patent No.: US 9,536,400 B2
(45) Date of Patent: Jan. 3, 2017

(54) ALARM SOUND DETECTION DEVICE

(71) Applicant: I & T Tech Co., Ltd., Osaka (JP)

(72) Inventor: Katsuhiko Asada, Hyogo (JP)

(73) Assignee: I & T Tech Co., Ltd., Osaka (JP)

( * ) Notice: Subject to any disclaimer, the term of this patent is extended or adjusted under 35 U.S.C. 154(b) by 549 days.

(21) Appl. No.: 13/829,364

(22) Filed: Mar. 14, 2013

(65) Prior Publication Data

US 2014/0267710 A1 Sep. 18, 2014

(51) Int. Cl.
*G08B 1/08* (2006.01)
*G08B 1/00* (2006.01)
*H04N 7/18* (2006.01)
*G08B 3/10* (2006.01)
*G08B 1/02* (2006.01)

(52) U.S. Cl.
CPC . *G08B 1/08* (2013.01); *G08B 1/00* (2013.01); *G08B 3/10* (2013.01); *H04N 7/188* (2013.01); *G08B 1/02* (2013.01)

(58) Field of Classification Search
CPC ............... G08B 3/08; G08B 1/00; G08B 1/02; G08B 1/10
See application file for complete search history.

(56) References Cited

U.S. PATENT DOCUMENTS

| | | | | |
|---|---|---|---|---|
| 4,691,196 A | * | 9/1987 | Kern | F23N 5/082 250/339.15 |
| 4,785,292 A | * | 11/1988 | Kern | F23N 5/082 250/339.15 |
| 5,644,634 A | * | 7/1997 | Xie | H04Q 1/457 379/382 |
| 8,269,625 B2 | * | 9/2012 | Hoy et al. | 340/540 |
| 2002/0005894 A1 | * | 1/2002 | Foodman et al. | 348/143 |
| 2011/0025499 A1 | * | 2/2011 | Hoy | G08B 3/10 340/540 |
| 2012/0206265 A1 | * | 8/2012 | Solazzo | A61F 13/42 340/573.5 |

FOREIGN PATENT DOCUMENTS

JP 10-172076 A 6/1998
JP 3138429 B 6/1998

OTHER PUBLICATIONS

M.A. Carbonneau, N. Lezzoum, J. Voix, & G. Gagnon, "Detection of alarms and warning signals on an digital in-ear device", 543 Int'l J. of Indus. Ergonomics 503-511 (available online Sep. 14, 2012).*
A. Temko, C. Nadeu, D. Macho, R. Malkin, C. Zieger, & M. Omologo, "Acoustic Event Detection and Classification", in "Computers in the Human Interaction Loop" 61-73 (Alexander Waibel & Rainer Stiefelhagen eds., 2009).*
D.P.W. Ellis, "Detecting Alarm Sounds", Columbia U. (2001).*

(Continued)

*Primary Examiner* — David N Werner
(74) *Attorney, Agent, or Firm* — Walter Haverfield LLP; D. Peter Hochberg; Sean F. Mellino

(57) ABSTRACT

By detecting the specific frequency component included in an alarm sound by a frequency analysis and a period analysis, even under a noisy and echo environment, a reliable, almost-no-false-detecting and small-sized abnormality detection device, which can detect the alarm sound, can be realized and then an integrated security system can be realized.

10 Claims, 9 Drawing Sheets

(56) References Cited

OTHER PUBLICATIONS

M. Linares, "Auto Dialer Wireless Smoke Detector/Alarm System", Cal. Poly. State U., 2010.*
University of Illinois, "ECE 463 Digital Communications Laboratory Course Notes", Jan.-May 2013, available online at https://courses.engr.illinois.edu/ece463/lectures/ECE%20463%20Baseband%20Antipodal.htm.*
D. Sarwate, "Understanding Matched Filter", Stack Exchange Signal Processing Forum, Jun. 2, 2013, available online at http://dsp.stackexchange.com/posts/9389/revisions.*
MathWorks, "Integrate and Dump", archived version as of Mar. 22, 2013 available online at https://web.archive.org/web/20130322041434/http://www.mathworks.com/help/comm/ref/integrateanddump.html.*

* cited by examiner

Basic configuration of abnormality detection device

Example of time domain change waveform
of alarm sound frequency component

Function extended abnormality detection device

Basic security system

ALARM SOUND DETECTION DEVICE

FIELD OF THE INVENTION

This invention is related to an anti-theft, abnormality detection device and its security system.

BACKGROUND OF THE INVENTION

Anti-theft self-alarming tags, which have been widely known in the store security field, include micro-processor like micro-computer, abnormality state detection circuit and buzzer alarm circuit etc inside the tag. In an emergency, tag emits the alarm sound which makes people feel uncomfortable, and makes people know the occurrence of abnormality state.

Abnormality state which emits the alarm sound, defines such a state as the said self-alarming tag is removed from the merchandise and/or as the self-alarming tag receives the signal from transmission antenna of EAS (Electro-Article Surveillance) antenna which is installed at the store entrance.

As its alarm sound, the intermittent type alarm sound whose alarm sound frequency is several kHz and alarm sound repetition cycle is few cycle/second, or the swept frequency type alarm sound whose alarm sound frequency is swept during some definite swept frequency period between upper limit frequency and lower limit frequency, is used.

Both alarm sounds have the same characteristics that some specific frequency component appears at the definite time interval.

When tag emits the alarm sound at the store with background music or with noise sound or at the wide floor space store and with few store staff, sometimes its alarm sound is erroneously detected or it was difficult for store staff to identify the alarm position and/or the shoplifter.

In addition, when tag which emit its alarm sound, is destroyed and/or is put into the water pod, its alarm sound will disappear in a short time or it is also very difficult to detect this alarm.

Furthermore when centralized security is needed, in which store security information is controlled at the store security room, alarm information which specifies the alarm sound occurrence position should be input to the security server PC and alarm sound detection equipment which specify the alarm sound occurrence position and communicate those information to the security server PC should be needed.

In the related art, in order to detect alarm sound, electro-magnetic signal from the tag, which is emitted when tag emits the alarm sound, was detected. This electro-magnetic signal may be derived as its leakage flux from inductor used in the alarm sound driving circuit.

As the detecting method of this electro-magnetic signal, receiving antenna is generally used, which is incorporated into the EAS (Electro-Article Surveillance) antenna and this type antenna is mentioned as the related art.

But this type of antenna was rather big as 1 m H*40 cm W and its price also rather expensive. So it was difficult to place the receiving antennas at several places in the store and increase the security level.

And EAS (Electro-Article Surveillance) antenna has its weak points in which signal detecting sensitivity becomes lower in the following cases.

In some cases, EAS antenna may receive the power line noise from antenna-nearby electronic lamp or electric motor, or in some cases, EAS antenna may receive the effect of comparably big transmission signal to make the tag alarm.

In some cases, if this type of big antenna would be installed in the high end brand store entrance, the antenna existence, itself, might damage the esthetic entrance image, and so EAS antenna would be buried under the floor. And in this under-the-floor antenna case, the antenna would receive more nearby electro-magnetic noise from under-the-floor power line and its performance would become more instable and poor.

Usually, security equipment like anti-theft tag emits the alarm sound, and so the sound detection method which receives the sound through microphone and detects the alarm sound, may realize the small size detection equipment.

But by the store background music, customer's voice, outside noise and furthermore by the echo sound from such wall and/or ceiling as the construction object, the alarm sound may be affected and its alarm sound becomes fairly different from the original alarm sound and then reliable detection of the alarm sound seemed to be difficult and so far, sound detection method of the alarm was not used in the security field.

This invention can detect the alarm sound of anti-theft tag as sound and provide the reliable detection method of the alarm sound and furthermore can realize the small-size high-performance abnormality detection device which emits various security information for store security control and then integrated security system can be realized by the abnormal state detection unit of this invention.

DISCLOSURE OF THE INVENTION

To resolve these issues, an abnormality detection device of this invention may be composed of a frequency analyzer calculating, by a frequency analysis, a specific frequency component included in an alarm sound to be detected and a period analyzer calculating a period component magnitude of a specific period in an output of the frequency analyzer by further frequency analyzing the output of the frequency analyzer and a judgment part judging an existence of the alarm sound by the period component magnitude.

An abnormality detection device may be composed of a frequency analyzer calculating, by a frequency analysis, a specific frequency component included in an alarm sound to be detected, a similarity detector calculating a degree of similarity between a time domain change pattern of a specific period at a period change of an output of the frequency analyzer and a time domain change pattern of a former period to the specific period by correlation coefficient and a judgment part judging an existence of the alarm sound by a magnitude of the degree of similarity.

An abnormality detection device may be composed of a frequency analyzer calculating, by a frequency analysis, a specific frequency component included in an alarm sound to be detected, a period analyzer calculating a period component magnitude of a specific period in an output of the frequency analyzer by further frequency analyzing the output of the frequency analyzer, a similarity detector calculating a degree of similarity between a time domain change pattern of a specific period at a period change of an output of the frequency analyzer and a time domain change pattern of a former period to the specific period by correlation coefficient and a judgment part judging an existence of the alarm sound by a combination between the period component magnitude and a magnitude of the degree of similarity.

An abnormality detection device of this invention may be equipped with at least one of a people detection sensor, a smoke detection sensor and a flame detection sensor as the security sensor.

An abnormality detection device of this invention may be equipped with a store staff call signal detector.

An abnormality detection device of this invention may be equipped with a wired communication unit or a radio communication unit.

An abnormality detection device of this invention may be equipped with a CCTV camera and a controller which controls an operation of the CCTV and/or a transmission of a CCTV camera image when the alarm sound is detected and/or the store staff call signal is detected.

The Effect of the Invention

According to this invention, an abnormality detection device can be realized, in which a false detection almost does not occur, an alarm sound detection from weak alarm sound becomes possible. And according to this invention, such security information as shoplifting, fire, customer's position at the store, and the position where customer calls store staff can be accessible.

And then based on this security information, it becomes possible to control CCTV camera system and monitor the store situation in detail by CCTV images and to constitute the integrated security system.

DESCRIPTION OF PREFERRED EMBODIMENT AND PRACTICES

Preferred embodiments of this invention are explained with reference to the drawings.

In each drawing used in the following explanation, the same part as the other drawing is indicated by the same number.

Figure 1:
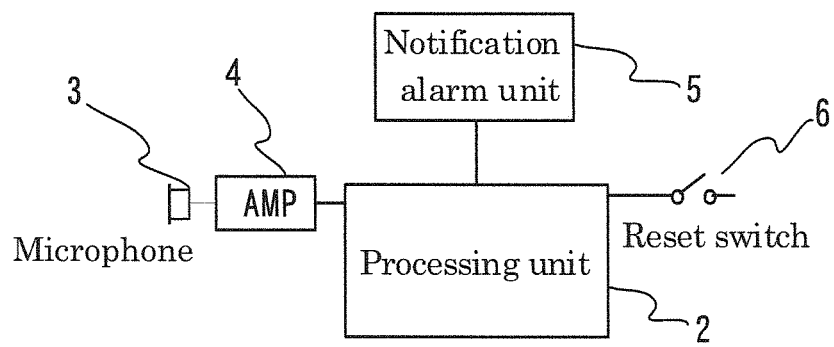
FIG. 1 is a block diagram of basic configuration of abnormality detection device.

FIG. 1 is a block diagram of basic configuration of abnormality detection device.

In the basic configuration, 2 represents a processing unit, 3 represents a microphone, 4 represents a microphone amplifier, 5 represents a notification•alarm unit, 6 represents a reset switch. Processing unit 2 has a plurality of IO ports, AD converter interface which analog signal can be input and processing function for digital signal processing.

Microphone 3 is used to input the alarm sound, emitted from the anti-theft tag etc. Microphone amplifier 4 has anti-alias filter function, having an analog band-pass filter function which mainly makes the frequency component of alarm sound pass, as well as an amplifier function which amplifies a weak microphone signal. Notification•alarm unit 5 indicates an alarm sound detection result by digital signal processing at the processing unit 2. Reset switch 6 is used to initialize the detection state of alarm sound at notification•alarm unit 5 by processing unit 2. As the reset switch 6 in this preferred embodiment, a remote control unit using infrared light or radio wave is used, but also a switch button can be used as a simple configuration of the reset switch. The characteristics of abnormality detection device as the preferred embodiment of this invention is in the detection method of alarm sound by digital signal processing at the processing unit 2. Target alarm sounds of this invention are the intermittent alarm sound with few cycle-per-second alarm sounds of the frequency of few kHz or the swept-frequency alarm sound which frequency sweeps repeatedly between the upper limit frequency and the lower limit frequency at a certain number of sweep frequency.

Each alarm sound has characteristics, in which a specific frequency component appears at a certain interval.

Basically at the intermittent alarm sound, in which a certain frequency of alarm sound appears at some frequency within a certain time interval or at the swept-frequency alarm sound, in which an alarm sound frequency is not constant, but sweeps between the upper limit frequency and the lower limit frequency at a certain number of sweep frequency, a certain frequency of alarm sound appears 2 times during its sweep period between the upper limit frequency and the lower limit frequency.

So paying attention to the fact that certain frequency of alarm sound appears 2 times at each sweep period, swept frequency alarm sound can be detected by the same as the detection method for the intermittent alarm sound.

Especially limited to some frequency region near the upper limit frequency and some frequency region near the lower limit frequency, the frequency varying range from the specific frequency component to the upper limit frequency or the frequency varying range from the specific frequency component to the lower limit frequency is limited to the narrow frequency range, and then the frequency varying range is occupied by the near frequency component to the specific frequency component.

So the specific frequency component appears 2 times closely in the vicinity of the sweep turn-around frequency and frequency components close to the specific frequency component continuously appear after the specific frequency component appears till the same specific frequency component appears again.

The duration in which frequency components near this specific frequency component appear in the vicinity of the sweep turn-around frequency is longer than the duration in which the specific frequency component appears when the frequency sweeps from the upper limit frequency to the lower limit frequency. And so when the frequency near the upper limit frequency or the lower limit frequency is chosen as the specific frequency, target alarm sound may be detected more certainly.

Figure 2:
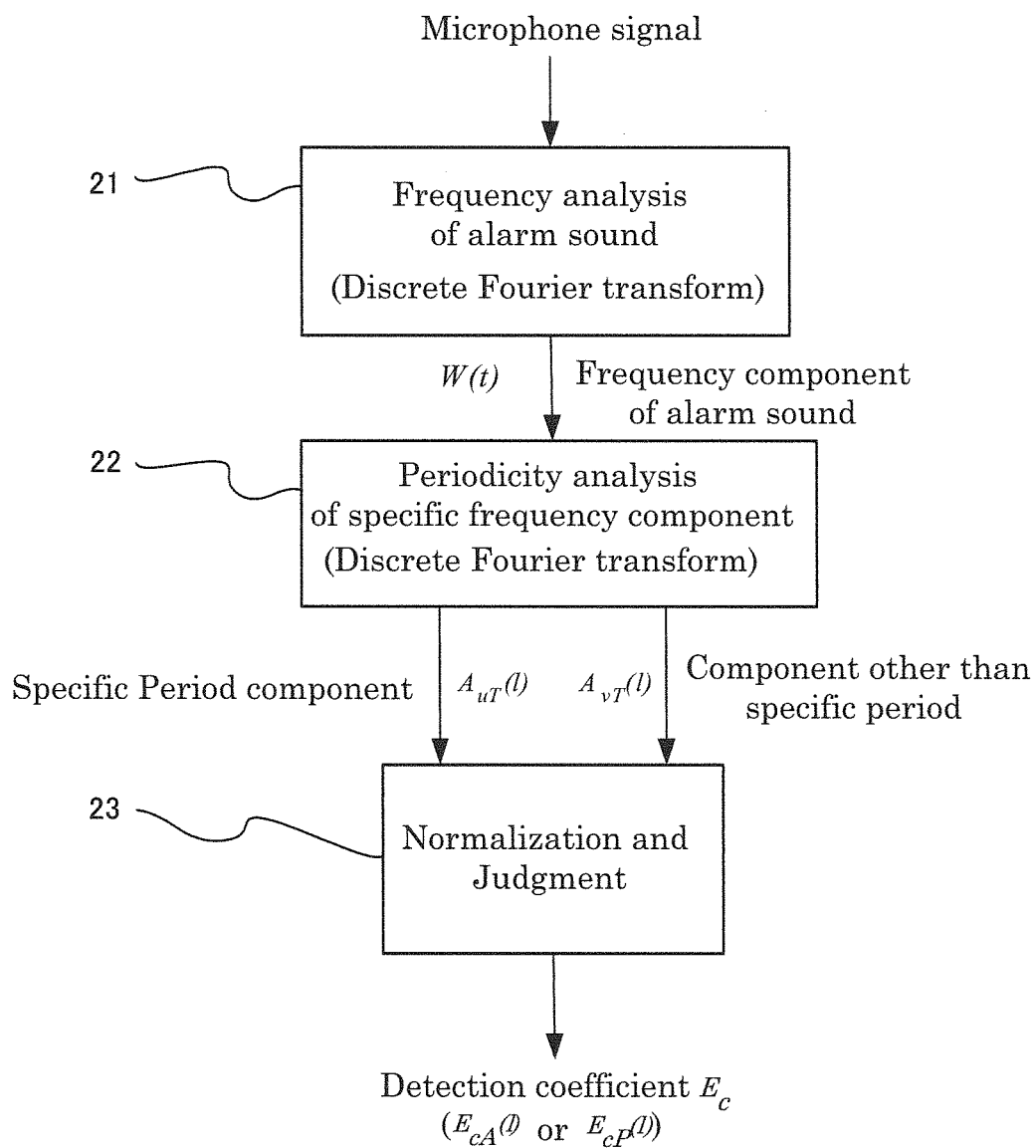
FIG. 2 shows a detection method based on periodic appearance of specific frequency component.

As the first embodiment of this invention, FIG. 2 shows the alarm sound detection method based on the periodic appearance of the specific frequency component. Firstly the specific frequency component of the alarm sound is detected by the frequency analyzer 21. In this case, frequency amplitude and/or power component are calculated sequentially by such a frequency analysis as discrete Fourier transform analysis at the several period (for ex. 4-32 periods) of the alarm sound.

This analysis process method can be shown as follows by the discrete Fourier transform analysis. Sound signal including target alarm sound detected at microphone 3 can be digitally input into processing unit 2 through microphone amplifier 4. At this time, sound signal is sampled at the sampling frequency k·f(k>2), k—times of the specific frequency f included in the target alarm sound.

Digital signal sampled at the n th order is denoted as St(n). Discrete Fourier transform $S_f(f)$ of detected alarm sound sampled at the duration of m-times of period 1/f of the specific frequency f included in the target alarm sound, is shown in Equation 1 in the form of complex expression using imaginary part j.

$$S_f(f) = a(f) + jb(f), \quad \text{[Equation 1]}$$

$$\text{in which } a(f) = \sum_{i=n}^{n+km-1} S_t(i) \cos 2\pi \frac{i}{k},$$

$$b(f) = - \sum_{i=n}^{n+km-1} S_t(i) \sin 2\pi \frac{i}{k}$$

From this, the amplitude component of specific frequency included in the alarm sound is shown in Equation 2.

$$A(f) = \sqrt{a^2(f) + b^2(f)} \quad \text{[Equation 2]}$$

And power component of specific frequency is shown in Equation 3.

$$P(f) = a^2(f) + b^2(f) \quad \text{[Equation 3]}$$

This amplitude component and/or power component are calculated sequentially at each m-times period of the specific frequency of the target alarm sound. When number m is increased, discrimination capability of the frequency component will be increased. But the time interval sequentially calculating the frequency component becomes coarse. So by the method that m-period calculation is done overlapping the former calculation period, time domain change of amplitude component and power component of the specific frequency can be calculated in a shorter time interval.

Figure 3:
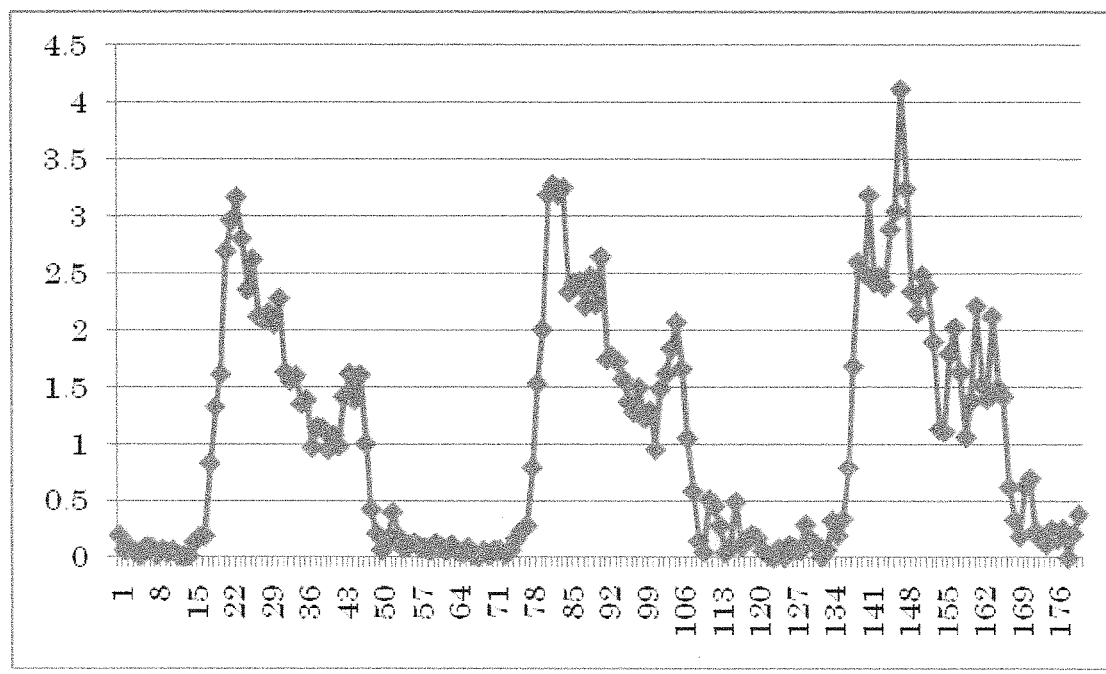
FIG. 3 shows an example of time domain change waveform of alarm sound frequency component.

One example of frequency component calculated by this method is shown in FIG. 3. In FIG. 3, the horizontal axis shows the calculation order calculating the specific frequency component by the frequency analysis and corresponds to the passage of time. Hereby the frequency analysis is performed, setting calculation period as 16 periods of the specific frequency and overlapping 8 periods of former 16 calculation periods during the calculation period of 16 periods.

The vertical axis shows the magnitude of amplitude component A(f) of the specific frequency component including in the alarm sound. As shown in this waveform, alarm sound frequency component appears intermittently at each period in which the specific frequency appears, but its waveforms distort by surrounding noise and echo sound at the environment which the alarm sound is received and sometimes its waveform becomes more distorted waveform depending on the environment.

Furthermore, the period analyzer 22 shown in FIG. 2 analyzes the periodicity of the specific frequency of the alarm sound. That is, by the further frequency analysis to the amplitude component and/or the power component A(f) of the specific frequency calculated in the above calculation method, a period component which a specific frequency component repeatedly appears is calculated. This period component is defined as the detection coefficient Ec and by its period component magnitude, a judgment part 23 judges an existence of the alarm sound.

Therein by performing the frequency analysis at the time duration of several cycles (for ex. 2 cycles to 8 cycles) of a period in which a specific frequency component appears, the detection coefficient Ec is calculated by the amplitude component and/or power component of the specific period and thus the discrimination capability of repeatedly-appearing period component can be increased.

Therein by calculating period component including direct current component other than the repeatedly-appearing period component and then dividing repeatedly-appearing period component by an aforesaid other period component, the normalized factor is calculated.

By using this normalized period factor, as both the repeatedly-appearing period component and the other period component are proportionate to the microphone sound volume, wide range of alarm sound detection which does not depend on microphone sound volume, can be possible.

The aforesaid process is explained by using equations. The t-th order value of amplitude components A(f) and/or power components P(f) of the specific frequency of an alarm sound calculated by the frequency analyzer 21 is denoted as W (t).

Repeatedly-appearing period of a specific frequency component corresponds to the duration which W(t) is calculated T times. Then Fourier series expansion is calculated at uT pieces of W(t), where u is integer number, and then the period component which the specific frequency repeatedly appears, corresponds to u-th degree Fourier series. Then these calculations are performed in series, and Fourier series $V_{vT}(l)$ calculated at l-th calculation is shown as Equation 4.

$$V_{vT}(l) = a_{vT}(l) + jb_{vT}(l), \quad \text{[Equation 4]}$$

$$\text{in which } a_{vT}(l) = \sum_{i=l \cdot uT}^{(l+1) \cdot uT-1} W(i) \cos 2\pi \frac{vi}{uT},$$

$$b_{vT}(l) = - \sum_{i=l \cdot uT}^{(l+1) \cdot uT-1} W(i) \sin 2\pi \frac{vi}{uT}$$

Now the amplitude component, corresponding to the magnitude which the specific frequency repeatedly appears, is shown in Equation 5.

$$A_{vT}(l) = \sqrt{a_{vT}^2(l) + b_{vT}^2(l)} \quad \text{[Equation 5]}$$

And its power component is shown in Equation 6.

$$P_{vT}(l) = a_{vT}^2(l) + b_{vT}^2(l) \quad \text{[Equation 6]}$$

Here v is denoted as the degree of Fourier series and its range is 0≤v≤u.

When v=u, these equations correspond to a magnitude of a period component which the specific frequency of the alarm sound repeatedly appears. And when this amplitude component and/or power component is large enough, it means the detection of the alarm sound.

V=0 means the direct current component, gives the average value of the specific frequency component included in the alarm sound, during the calculation duration. These components are proportionate to the microphone sound volume. Thus when the detection coefficient like Equation 7 or Equation 8, which is normalized by other frequency component including direct current component, is used, detection of alarm sound which does not depend on microphone sound volume, becomes possible.

$$E_{cA}(l) = \frac{A_{uT}(l)}{A_{vT}(l)} \quad \text{[Equation 7]}$$

or $$E_{cP}(l) = \frac{P_{uT}(l)}{P_{vT}(l)} \quad \text{[Equation 8]}$$

Especially when the detection coefficient is normalized by direct current component, in case the specific frequency component of target alarm sound appears more in the surrounding noise, detection coefficient Ec becomes small and false detection possibility becomes small and calculation amount also can be reduced. Herein the detection coefficient given in $E_{CA}(l)$ or $E_{CP}(l)$ is denoted as Ec.

In the ideal case when duty cycle of the specific frequency component is 50% and there is no noise and no echo sound, time domain waveform of frequency component of alarm sound shown in FIG. 3 becomes a rectangular pulse waveform. In this case, the detection coefficient, normalized by direct current component, becomes Equation 9 when it is calculated by amplitude value, and becomes Equation 10 when it is calculated by power value.

$$E_{cA} = \frac{2}{\pi} \cong 0.637 \quad \text{[Equation 9]}$$

or $$E_{cP} = \left(\frac{2}{\pi}\right)^2 \cong 0.405 \quad \text{[Equation 10]}$$

And by setting the threshold value less than these values, judgment of the existence of the target alarm sound can be possible.

In the case where there is an echo sound, as the reflection sound is superimposed to the alarm sound, a detected alarm sound shows a distortion at time domain change waveform of the specified frequency component. In extreme cases, when the time domain change waveform of the specific frequency of the alarm sound is further analyzed by the period analyzer 22 of specific frequency component shown in FIG. 2, the specific frequency component inherent to the alarm sound almost does not include a repeatedly-appearing period component inherent to the alarm sound, but includes much more its harmonic component.

Figure 4:
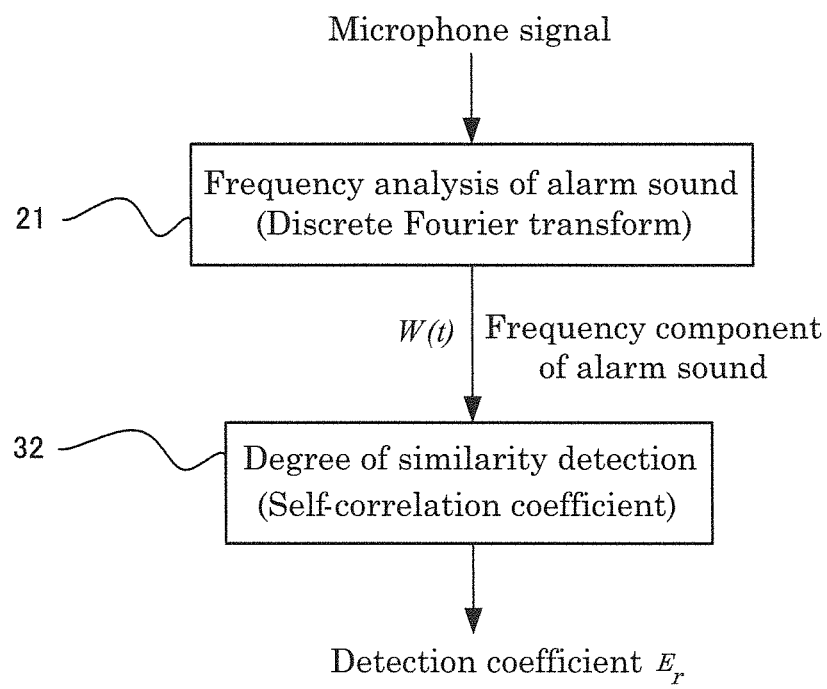
FIG. 4 shows a detection method based on degree of similarity of time domain change waveform of specific frequency component.

In this case, detection method by degree-of-similarity of time domain change waveform of the specific frequency is effective, shown in FIG. 4 as the $2^{nd}$ embodiment of this invention.

If sound source of the alarm sound and microphone installation environment are not changed, both the period which a specific frequency component appears and time domain change waveform of a specific frequency component of alarm sound seem to be nearly the same.

Self-correlation coefficient at the specific frequency component included in an alarm sound, calculated by the frequency analyzer 21 is calculated. That is, by the similarity detector 32, self-correlation coefficient between time domain change waveform of a specific frequency component and time domain change waveform of specific frequency component on past/former period is calculated during the period in which the specific frequency component appears.

Magnitude of this self-correlation coefficient gives the detection coefficient Er and by its magnitude of self-correlation coefficient, a judgment of an existence of the target alarm sound can be possible.

The aforesaid process is explained using equations. The t th order value of amplitude component and/or power component of the specific frequency of the alarm sound, calculated by the frequency analyzer 21, is denoted as W(t).

Suppose that the repeatedly-appearing period of a specific frequency component corresponds to the period which W(t) is calculated T-times, a detection coefficient Er(q) calculated at the q-th order can be calculated by the following self-correlation coefficient.

$$E_r(q) = \frac{\sum_{i=qT}^{q(T+1)-1} W(i) \cdot W(i-hT)}{\sqrt{\sum_{i=qT}^{q(T+1)-1} W^2(i)} \cdot \sqrt{\sum_{i=qT}^{q(T+1)-1} W^2(i-hT)}} \quad \text{[Equation 11]}$$

Herein h is the number, indicating that the self-correlation coefficient between a specific frequency component and a specific frequency component at h-th period before is calculated. Time domain change waveform of a specific frequency component included in alarm sound varies depending on the change of detection environment.

Herein regarding h, the case h=1 is desirable, at which the self-correlation coefficient between a specific frequency component of an alarm sound and a specific frequency component at just one period before is calculated. However as the case that same detection environment appears again after several periods have passed, may happen, a detection coefficient Er other than h=1 may be effective.

Although W(t) depends on microphone sound volume, according to Equation 11, when 2 period waveforms are completely same, Er(q)=1. And then by setting threshold less than 1, a judgment of an existence of the target alarm sound can be possible. Furthermore as this detection coefficient Er(q) includes the same order of W(t) in its denominator and numerator, Er(q) does not depend on microphone sound volume setting.

Figure 5:
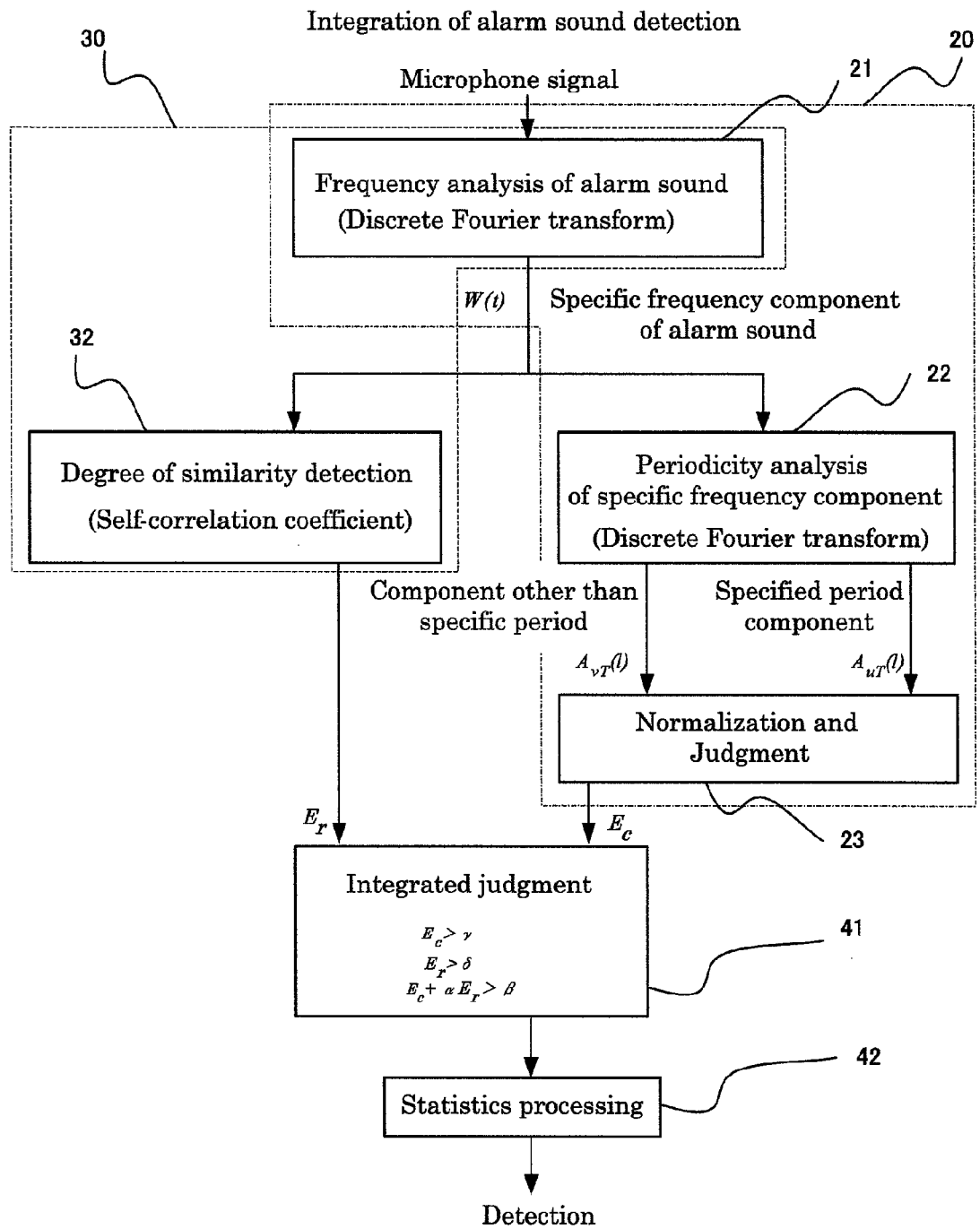
FIG. 5 shows an integration of alarm sound detection.

FIG. 5 shows the third embodiment of this invention. That is at the process block 20 surrounded with dotted line, firstly a specific frequency component W(t) of the alarm sound is calculated by the frequency analyzer 21.

Secondly further frequency analysis by the period analyzer 22, using the same Fourier transform etc., at the time domain change waveform of an amplitude component A(f) or a power component P(f) of the specific frequency component calculates the repeatedly-appearing period component of specific frequency component $A_{uT}(l)$.

At this time, period component $A_{vT}(l)$ other than the repeatedly appearing period component of specific frequency component, is also calculated, and by the normalization that $A_{uT}(l)$ is divided by $A_{vT}(l)$ and the judgment part 23, the detection coefficient Ec is calculated.

Further this process 20 which calculates detection coefficient Ec is the same method as the period analyzer of a specific frequency component, as shown in FIG. 2 as the first embodiment of this invention.

On a parallel with the aforesaid process, at the process block 30 surrounded by dotted line shown in FIG. 5, by the similarity detector 32, the self-correlation coefficient Er between time domain change pattern W(t) of a specific frequency component calculated by a frequency analyzer 21 and time domain change pattern of a specific frequency component at former period is calculated during the period duration in which a specific frequency component appears.

Further this process 30 which calculates the detection coefficient is the same method as the similarity detector of time domain change waveform of a specific frequency component, shown in FIG. 4 as the second embodiment of this invention.

Further in FIG. 5, frequency analyzer 21 is used both in the first embodiment of this invention and second embodiment of this invention and is commonly used and shown in this figure, but frequency analyzer 21 can be used separately.

Total judgment part 41 detects the alarm sound by the relationship inequality of 2 detection coefficients Ec and Er.

As an example, the case in which simple $1^{st}$ order relationship inequalities are used, is shown in the following. That is, in this example, when following 3 conditions are met, alarm sound detection is judged.

$$E_c > \gamma \quad \text{[Equation 12]}$$

$$E_r > \delta \quad \text{[Equation 13]}$$

$$E_c + \alpha E_r > \beta \quad \text{[Equation 14]}$$

Herein the values $\alpha$, $\beta$, $\gamma$, $\delta$ shown in aforesaid inequalities can be decided by experiment, when there is no alarm sound, on the condition that false detection rarely occurs. Conditional inequalities Equation 12 and Equation 13 are eliminated when each detection coefficient is extremely small and conditional inequality Equation 14 is the judgment criteria when each detection coefficient is not a small value. As the relationship inequality, it is possible to use more than $2^{nd}$ order inequality or elementary function.

At the total judgment part 41, constants $\alpha$, $\beta$, $\gamma$, $\delta$ are chosen in order to avoid the false detection. Normally surrounding environment in which alarm sound detection device detects the alarm sound, may not be fixed and sound source of alarm sound may move and noise signal also changes due to the environment changes.

So even though the alarm sound is made, sometimes there may be the case that continuous alarm sound detection becomes not possible because of the environment change. For this reason, at the statistical process part 42 shown in FIG. 5, by setting the judgment condition if it detects more than m-times among total n-times, it seems to detect the alarm sound, better detection performance can be obtained.

Herein, n and m are chosen by the system installation condition.

$$n > m \quad \text{[Equation 15]}$$

Thus by using total judgment process, highly reliable alarm sound detection system with almost no false detection can be realized.

At the processing unit 2, when frequency component is calculated by Fourier transform, it is possible to detect the alarm sound by either amplitude component or power component. But as the amplitude component requires the root mean square calculation, it is easy to use power component, because its calculation can be reduced. Similarly also in the case where the self-correlation coefficient is calculated, root mean square calculation is needed, but as only magnitude judgment is needed, it is possible to square the self-correlation coefficient and judge its magnitude, resulting in the calculation reduction.

Basic abnormality detection device, according to the embodiment of this invention, can realize the small sized device, by using IC like one chip micro processor, customized logic device or programmable general purpose logic device etc., as the processing unit 2. Furthermore by adding various sensors and/or by adding wired or radio communication function, it becomes possible to emit the information which is detected at the terminal device and to control the terminal device by the direction from the security system controller.

And based on acquired information, it becomes possible to control CCTV camera system and to capture the abnormality image and memorize those abnormality image into memory. From this, this abnormality detection device can be used for the integrated store security system as well as for the alarm sound detection.

Furthermore small computer system like personal computer can be used as processing unit 2. Microphone is connected to the audio interface of personal computer and the program realizing the embodiment of this invention is executed in this personal computer and thus alarm sound detection device can be easily realized.

Furthermore in this embodiment, although the discrete Fourier transform is mentioned to be used for signal frequency analysis, orthogonal transform also can be used for this analysis.

Figure 6:
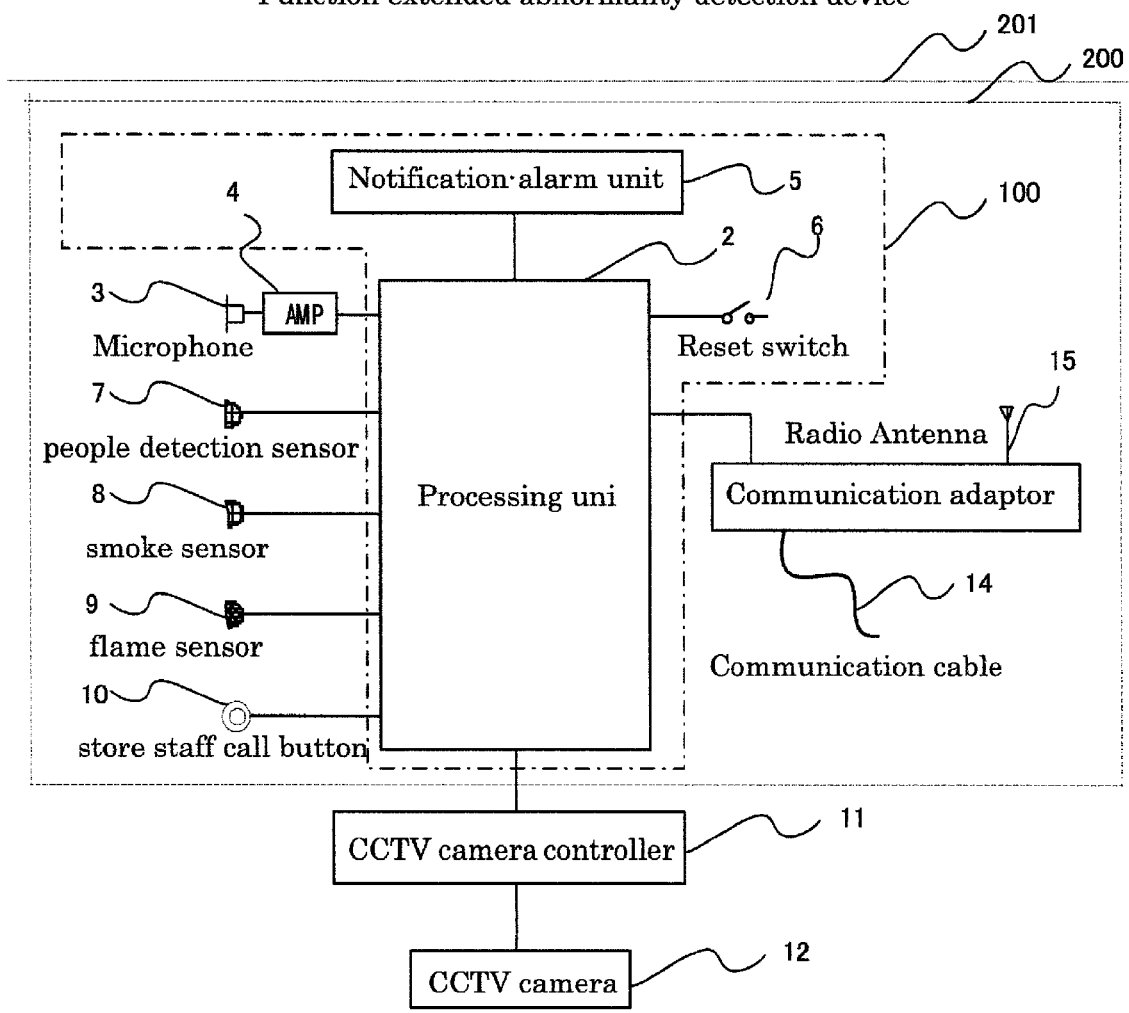
FIG. 6 shows a function extended abnormality detection device.

FIG. 6 shows the extended abnormality detection device which includes various types of sensors added to the basic abnormality detection device shown in FIG. 1. In this drawing, basic abnormality detection device is denoted as 100 and is surrounded by dotted line.

Also to the basic abnormality detection device 100, people detection sensor 7, smoke sensor 8, flame sensor 9 and store staff call button 10 are added and also network adaptor 13, wired communication line 14 and/or radio communication antenna 15 are added, and thus extended abnormality detection device is denoted as 200 and is surrounded by dotted line.

Furthermore the extended abnormality detection device, to which CCTV camera controller 11 for CCTV camera 12 is added, is denoted as 201 and is surrounded by dotted line. These additional functions are, as is needed, added to the basic abnormality detection device and thus the extended abnormality detection device can be configured.

Figure 7:
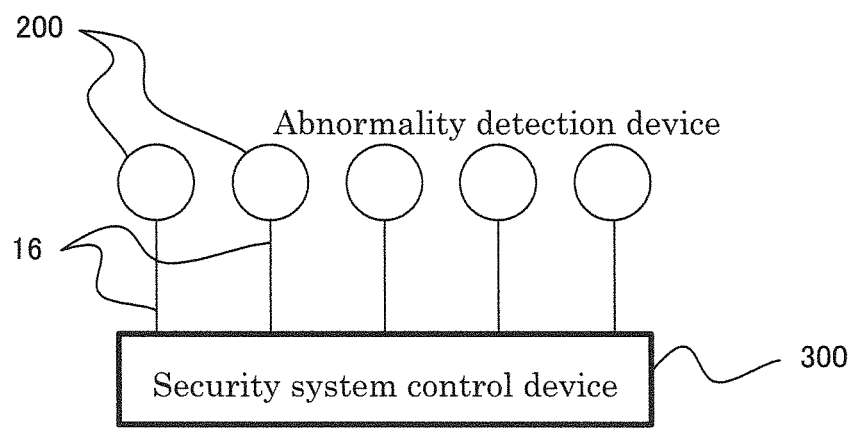
FIG. 7 shows a basic security system.

FIG. 7 shows the integrated security system which is composed of a plurality of extended abnormality detection devices 200 shown in FIG. 6. This security system is composed of security system controller 400, the plurality of extended abnormality detection devices 200 and communication lines 16 which are connected to each other by wired communication line and/or radio communication line. When the plurality of extended abnormality detection devices 200 are installed in the store, and those are connected to the security system controller 300, by the communication line 16; wired or radio, it will be possible that security information can be gathered quickly, the place where abnormality occurs in the store can be identified and then the store staff can respond quickly to the abnormality.

Figure 8:
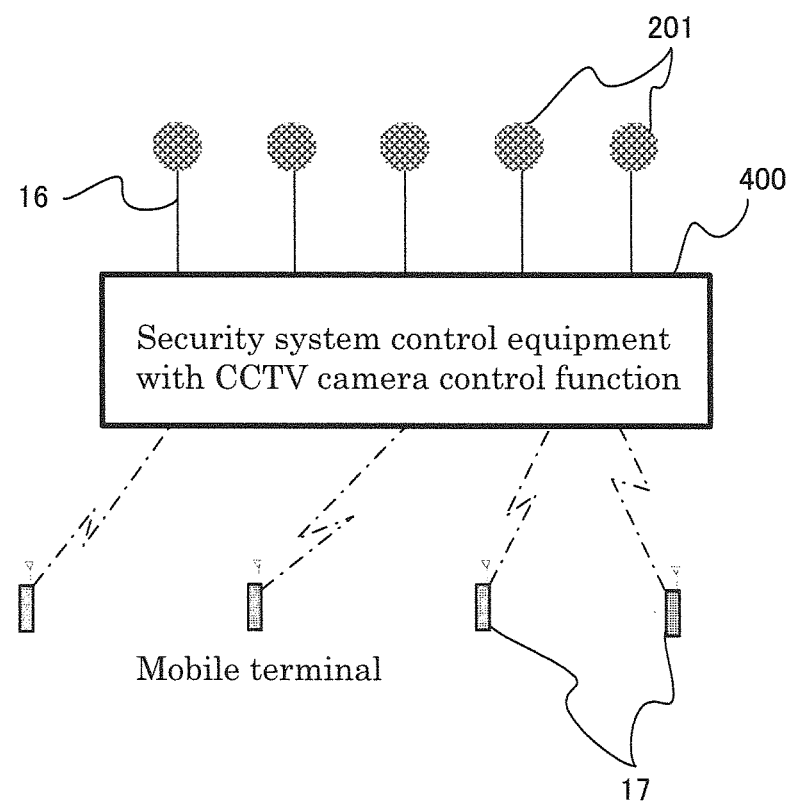
FIG. 8 shows a security system using abnormality detection device with CCTV camera control function.

Especially FIG. 8 shows the application case that the extended abnormality detection devices 201 which have CCTV camera control function are placed at several places in the store, and CCTV cameras 12, which correspond to each extended abnormality detection device 201, are also placed in the store. And each abnormality information can be transferred to the security system controller 400 through network interface unit 12 and wired communication line 13 and/or radio communication line 14.

Configured like this, the state of specific place of the store in which abnormality occurs can be monitored on the security system controller 400, the position of extended abnormality detection devices 201 which emit the abnormality alarm, can be displayed on the monitor which composes the security system control unit 2, the image of CCTV camera 12 which corresponds to the relevant abnormality detection devices 201 can be monitored and the shoplifter's image in case alarm sound or customer's image who pushes the staff call button in case staff call, are monitored and store staffs quick response can be possible.

Furthermore as shown in FIG. 8, by transferring those security information to the store staff's mobile terminal 17 through security system controller 400, more effective management system can be realized. Moreover in case suspicious individual or shoplifter, by using the CCTV camera images, chasing and checking the suspicious individual becomes easy and blacklist of suspicious individual can be made, and preventive/deterrent call to the suspicious individuals becomes possible when they come to the store again and then more effective security can be expected.

Furthermore according to this invention, the extended abnormality detection devices 200 and the abnormality detection devices 201 which were previously the individual, stand alone security device, can be connected to each other and connected to security system control equipment 400 via each other and thus integrated security system can be realized.

Figure 9:
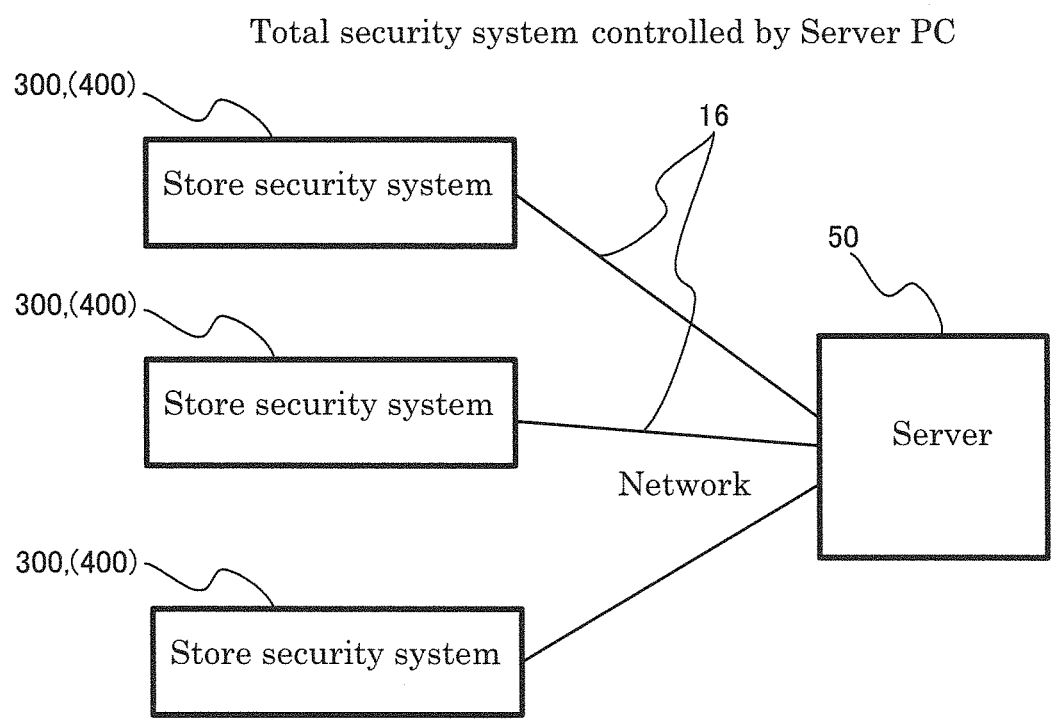
FIG. 9 shows a total security system controlled by Server PC

Furthermore as shown in FIG. 9 where there are a plurality of stores, when each store's security system control equipments 300, security system control equipments 400 with CCTV camera control function can be connected to server PC 50 at headquarters' security control room, via communication line, it goes without saying that the integrated security system can be constituted where each store's security state can be monitored from the headquarters.

What is claimed is:

1. An abnormality detection device comprising:
   a frequency analyzer for calculating by a frequency analysis a specific frequency component included in an alarm sound to be detected;
   a similarity detector for calculating a degree of similarity between two separate time domain change patterns in a signal waveform indicating a time domain change of the specific frequency component in an output of the frequency analyzer, wherein for each of the two separate time domain change patterns the analysis of the frequency analyzer comprises a calculated degree of similarity between the time domain change pattern of a signal waveform of a specific period and the time domain change pattern of a signal waveform of a former period to the specific period; and
   a judgment part for judging an existence of the alarm sound by a magnitude of the degree of similarity;
   wherein said device comprises an equation to calculate a specific frequency component of a sequential alarm sound using discrete Fourier transform.

2. The abnormality detection device according to claim 1, further comprising as a security sensor, at least one sensor selected from the group consisting of a people detection sensor, a smoke sensor and a flame sensor.

3. The abnormality detection device according to claim 1, further comprising a store staff call signal detector.

4. The abnormality detection device according to claim 1, further comprising a communication unit selected from the group consisting of a wired communication unit and a radio communication unit.

5. The abnormality detection device according to claim 3, further comprising:
   a CCTV camera; and
   a system controller for controlling an operation of the CCTV and/or a transmission of a CCTV camera image when the alarm sound is detected and/or the store staff call signal is detected.

6. An abnormality detection device comprising:
   a frequency analyzer for calculating by a frequency analysis a specific frequency component included in an alarm sound to be detected;
   a period analyzer for calculating a period component of a specific frequency component in an output of the frequency analyzer by further frequency analyzing the output of the frequency analyzer;
   a similarity detector for calculating a degree of similarity between two separate time domain change patterns, in a signal waveform indicating a time domain change of the specific frequency component in an output of the frequency analyzer, wherein for each of the two separate time domain change patterns the analysis of the frequency analyzer comprises a calculated degree of similarity between the time domain change pattern of a signal waveform of a specific period and the time domain change pattern of a signal waveform of a former period to the specific period; and
   a judgment part for judging an existence of the alarm sound by a combination between a period component magnitude and a magnitude of the degree of similarity;
   wherein said device comprises an equation to calculate a specific frequency component of a sequential alarm sound using discrete Fourier transform.

7. The abnormality detection device according to claim 6, further comprising as a security sensor, at least one sensor selected from the group consisting of a people detection sensor, a smoke sensor and a flame sensor.

8. The abnormality detection device according to claim 6, further comprising a store staff call signal detector.

9. The abnormality detection device according to claim 6, further comprising a communication unit selected from the group consisting of a wired communication unit and a radio communication unit.

10. The abnormality detection device according to claim 8, further comprising:
    a CCTV camera; and
    a system controller for controlling an operation of the CCTV and/or a transmission of a CCTV camera image when the alarm sound is detected and/or the store staff call signal is detected.

* * * * *